US011511694B2

(12) United States Patent
Peeters

(10) Patent No.: US 11,511,694 B2
(45) Date of Patent: Nov. 29, 2022

(54) VEHICLE

(71) Applicant: Peeters Landbouwmachines B.V., Etten-Leur (NL)

(72) Inventor: Daniel Petrus Marie Peeters, Nieuwmoer-Kalmthout (BE)

(73) Assignee: PEETERS LANDBOUWMACHINES B.V., Etten-Leur (NL)

(*) Notice: Subject to any disclaimer, the term of this patent is extended or adjusted under 35 U.S.C. 154(b) by 203 days.

(21) Appl. No.: 16/762,652

(22) PCT Filed: Jan. 18, 2019

(86) PCT No.: PCT/NL2019/050027
§ 371 (c)(1),
(2) Date: May 8, 2020

(87) PCT Pub. No.: WO2019/143245
PCT Pub. Date: Jul. 25, 2019

(65) Prior Publication Data
US 2020/0269797 A1  Aug. 27, 2020

(30) Foreign Application Priority Data
Jan. 18, 2018  (NL) ..................................... 2020295

(51) Int. Cl.
*B60R 21/13* (2006.01)
*B60J 5/04* (2006.01)
(Continued)

(52) U.S. Cl.
CPC .......... *B60R 21/131* (2013.01); *B60J 5/0487* (2013.01); *B60J 5/062* (2013.01); *B60N 2/002* (2013.01);
(Continued)

(58) Field of Classification Search
CPC .......... B60R 21/131; B60R 2021/0273; B60R 2021/028; B60J 5/0487; B60J 5/062; B62D 12/00; B62D 33/0625; E02F 9/163
See application file for complete search history.

(56) References Cited

U.S. PATENT DOCUMENTS 3,244,251 A * 4/1966 Duncan .................. A01B 51/00
188/177
3,337,993 A * 8/1967 Von Seggern ...... E05B 65/0811
49/281
(Continued)

FOREIGN PATENT DOCUMENTS

DE  36 32 416 A1  4/1988
DE  43 15 824 A1  11/1994
DE  19 932 256 A1  1/2001

OTHER PUBLICATIONS

International Preliminary Report on Patentability in International Application No. PCT/NL2019/050027, dated Jan. 22, 2020 (21 pages).

*Primary Examiner* — Frank B Vanaman
(74) *Attorney, Agent, or Firm* — Nixon Peabody LLP

(57) ABSTRACT

A vehicle includes a frame, and at least one front and rear wheel. The total number of front and rear wheels is at least three. The vehicle includes a mechanism for driving at least one of the front and rear wheels, a seat for a driver, and at least one fall prevention element to prevent, in a closed position of the fall prevention element, a driver from falling off the seat. In an open position of the fall prevention element, a driver can freely take a seat from the outer side of the vehicle via the space which, in the closed position, is occupied by the fall prevention element, or can step out of the vehicle; the fall prevention element slides between the open and closed positions.

8 Claims, 3 Drawing Sheets

(51) Int. Cl.
  *B60J 5/06* (2006.01)
  *B60N 2/00* (2006.01)
  *B62D 12/00* (2006.01)
  *B62D 33/06* (2006.01)
  *E02F 9/16* (2006.01)
  *B60R 21/02* (2006.01)

(52) U.S. Cl.
  CPC ......... *B62D 12/00* (2013.01); *B62D 33/0625* (2013.01); *E02F 9/163* (2013.01); *B60R 2021/028* (2013.01); *B60R 2021/0273* (2013.01)

(56) References Cited

U.S. PATENT DOCUMENTS

| | | | | |
|---|---|---|---|---|
| 4,152,870 | A * | 5/1979 | Knap | B61D 19/02 49/118 |
| 4,502,246 | A * | 3/1985 | Minami | E05F 5/003 49/213 |
| 4,579,191 | A * | 4/1986 | Klee | B60R 21/02 297/488 |
| 5,971,434 | A * | 10/1999 | Neufeld | B60R 21/02 280/756 |
| 6,902,024 | B2 * | 6/2005 | Müller | B66F 9/07545 180/271 |
| 7,624,836 | B2 * | 12/2009 | Huang | B62D 6/002 701/41 |
| 2008/0129085 | A1 | 6/2008 | Kim | |
| 2018/0100289 | A1 * | 4/2018 | Hamaguchi | H04L 9/3226 |

\* cited by examiner

VEHICLE

CROSS-REFERENCE TO RELATED APPLICATION

This application is a national stage of Application No. PCT/NL2019/050027 filed Jan. 18, 2019 and claims the benefit of priority from Netherlands Application No. 2020295 filed on Jan. 18, 2018, which are both incorporated by reference in their entireties.

The present invention relates to a vehicle. The invention relates in particular to construction vehicles, such as loaders, telescopic handlers, tractors, and generally tool carriers, whose main reason of existence is based on the fact that they are suitable to carry out certain tasks, such as in particular lifting a load. This distinguishes them from, for example, passenger vehicles, buses or lorries which are primarily suited for transporting people and/or goods. It is exactly because of their specific suitability that such construction vehicles are at an increased risk of tipping over during use.

Known relatively large shovels have a fall prevention element, which is formed by a hinged door by means of which a cab of the loader can be closed or opened. The invention is aimed at, in particular, but not exclusively, relatively small loaders in a weight category of 2,500 to 5,000 kg dead weight. More specifically, the invention is aimed at making such vehicles safer. Partly due to their limited wheel base combined with a load which raises the centre of gravity and is carried in a relatively high position in the vehicle and small turning circles, the risk of the vehicle tipping over, in particular if the vehicle is used on an uneven or sloping surface, is illusory. If the vehicle tips over or tilts, there is a risk that the driver falls from the vehicle. In practice, it has been found that drivers often do not use fall prevention elements, for example due to laziness or because their use is perceived as being inconvenient. However, their use may be of vital importance. When a vehicle tips over, a driver tends to have the reflex to jump out of the vehicle while it is tilting over and consequently the vehicle ends up on top of the driver. In this case, a fall prevention element may have the effect that a driver does not follow the abovementioned reflex and the former may thus prove to be life-saving. The invention is aimed at reducing the risk of a driver falling out of or at least of a driver falling from the vehicle.

By providing a vehicle on a longitudinal side of the seat with a fall prevention element which is slidable between the open position and closed position (or with two such fall prevention elements on two longitudinal sides of the seat situated opposite each other), it is intended to overcome the abovementioned drawbacks, in particular because the operation thereof may be easier.

The ease of use may be improved, in particular, if the vehicle is provided with locking means for keeping the fall prevention element in the open position in an operational state of the locking means. Such locking means may comprise, for example, a mechanical hook or clamp or may comprise, for example, a magnet.

In order to further increase the ease of use, the vehicle may furthermore be provided with operating means for operating the locking means.

These operating means comprise a switch which can be operated by the driver, but advantageously, the operating means may comprise further sensor means to detect whether or not there is a person sitting on the seat so as to further relieve the driver and, in addition, reduce the risk of the fall prevention element not being in the closed position if a driver is sitting on the seat. As soon as a person sits down on the seat, due to the operation of the further sensor means which actuate the operating means, the locking means may be brought into a non-operational position, as a result of which the fall prevention element can be closed.

Advantageously, closure of the fall prevention element may be performed if the vehicle comprises displacement means for moving the fall prevention element from the open position to the closed position, wherein, more preferably, the displacement means comprise an elastic spring element whose elasticity provides the driving force for moving the fall prevention element from the open position to the closed position.

The invention may be used particularly advantageously if the vehicle comprises two frame parts which are connected to each other so as to be pivotable, wherein the seat is preferably provided on the rear frame part.

The risk of tipping over and thus of a driver falling from the vehicle is higher if the vehicle is provided with a lifting arm for lifting a load. Therefore, a further embodiment of the invention is characterized by the fact that the vehicle is provided with a lifting arm.

In general, the invention is particularly suitable for vehicles with a dead weight of between 2,500 kg and 5,000 kg.

The invention will be explained in more detail below by means of the description of a possible embodiment of the vehicle according to the invention with reference to the following figures.

Figure 1A:
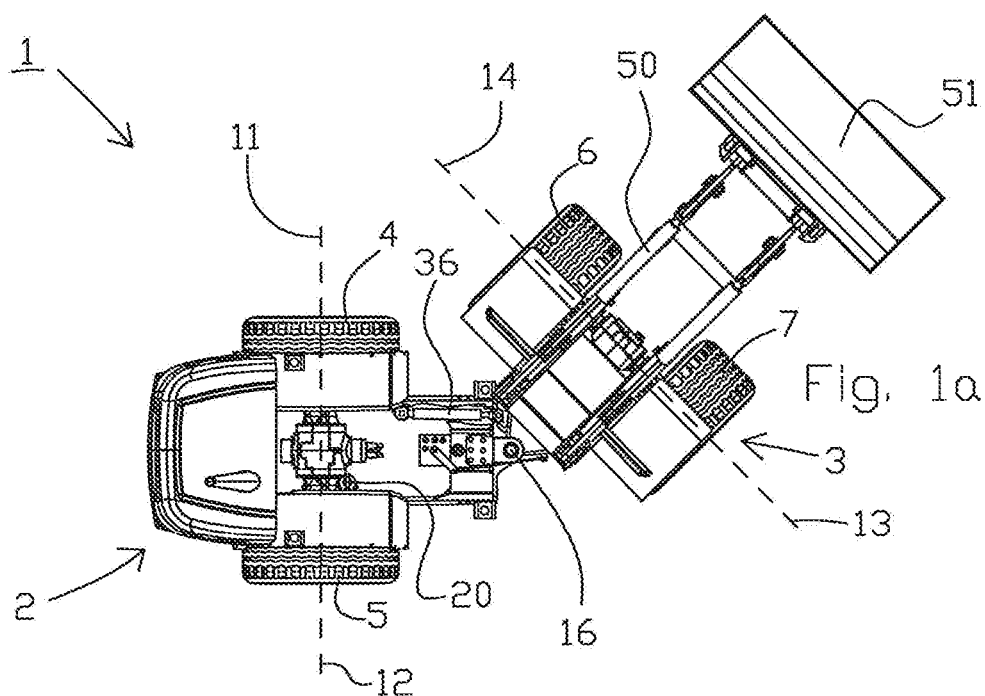
FIGS. 1a, 1b and 1c show a top view of an embodiment of a vehicle, the parts of which which are situated relatively high have not been illustrated for the sake of clarity, according to the present invention, wherein the front wheels of the vehicle are directed to the left, in line, and to the right, relative to the rear wheels respectively.

The vehicle as will be explained below by means of FIGS. 1a to 3 is a construction vehicle, more specifically a so-called articulated loader 1. The articulated loader 1 comprises a frame with a front frame part 3 and a rear frame part 2. The front frame part 3 is provided with two front wheels 6, 7 which are connected to the front frame part 3 so as to be rotatable about respective coaxial front horizontal rotation axes 13, 14. Furthermore, a lifting arm 50 is provided on the front frame part 3. At the front free end of the lifting arm 50, a bucket 51 is fitted for receiving a load, such as for example sand or silage. It is possible for another lifting tool to be fitted to the front frame part 3, such as for example a pallet fork, stone clamp, gin pole, stone rotator or a sweeping broom.

The rear frame part 2 has two rear wheels 4, 5 which are connected to the rear frame part 2 so as to be rotatable about respective coaxial rear horizontal rotation axes 11, 12. The connection between the two rear wheels 4, 5, on the one hand, and the rear frame part 2, on the other hand, is accomplished via a rear axle body 17. At its opposite ends, the rear axle body 17 is provided with respective wheel hubs 38, 39 (FIG. 8) to which the rear wheels 4, 5 are attached. The rear axle body 17 is able to swing to and fro with respect to the rear frame part 2 about a horizontal swinging axis 18 which is oriented at right angles to the respective rotation axes 11, 12 for the two rear wheels 4, 5.

The articulated loader 1 is furthermore provided with drive means which are not illustrated in more detail, such as for example a hydrostatic drive in which a hydro pump is driven by a diesel engine, or an electric motor, for driving both the two front wheels 6, 7 and the two rear wheels 3, 4 in a way which is already known to the person skilled in the art.

Figure 1B:
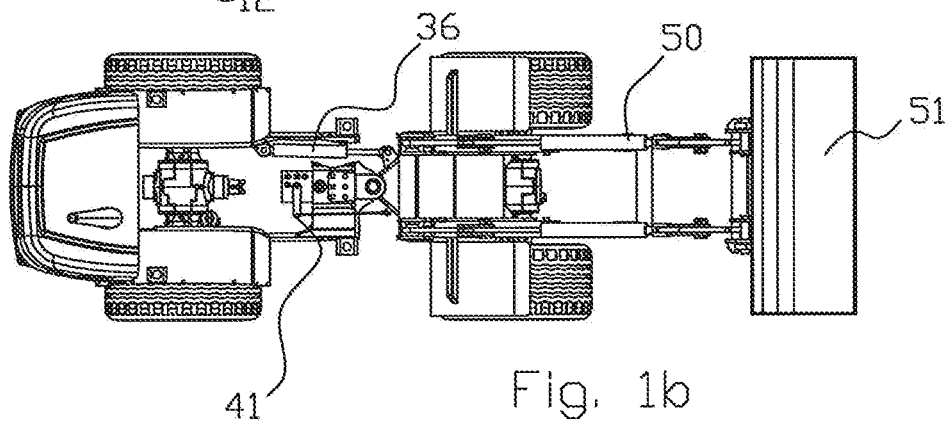
Figure 1C:
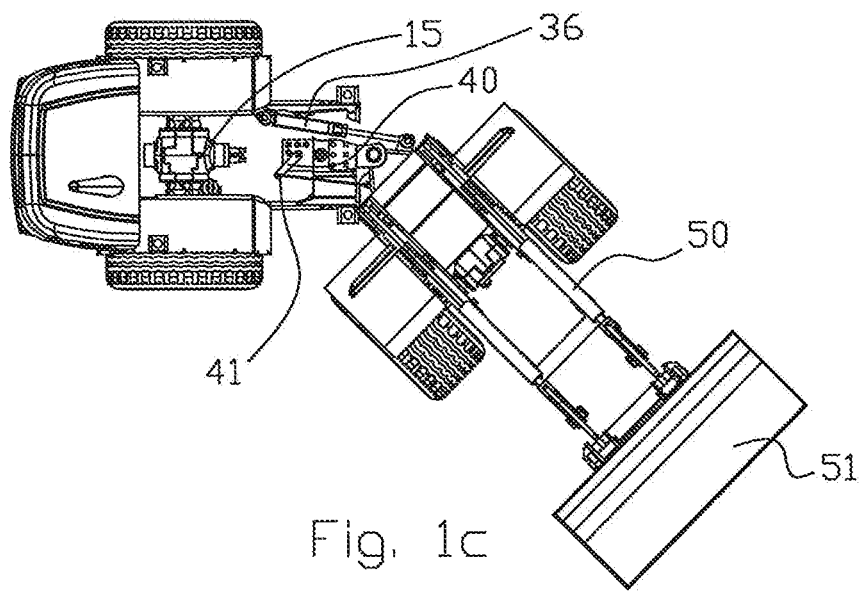

The articulated loader 1 may be steered by a driver seated in seat 62 by turning the wheel 64, in which case steering cylinder 36 is actuated which makes the front frame part 3 and the rear frame part 2 pivot about a vertical pivot pin with respect to each other so that the vehicle can be steered to the left, straight ahead and to the right, according to FIGS. 1a to 1c, respectively. This pivot pin coincides with the centre axis of pivot pin body 16 which pivotably connects the front frame part 3 and the rear frame part 2 to each other.

Figure 2:
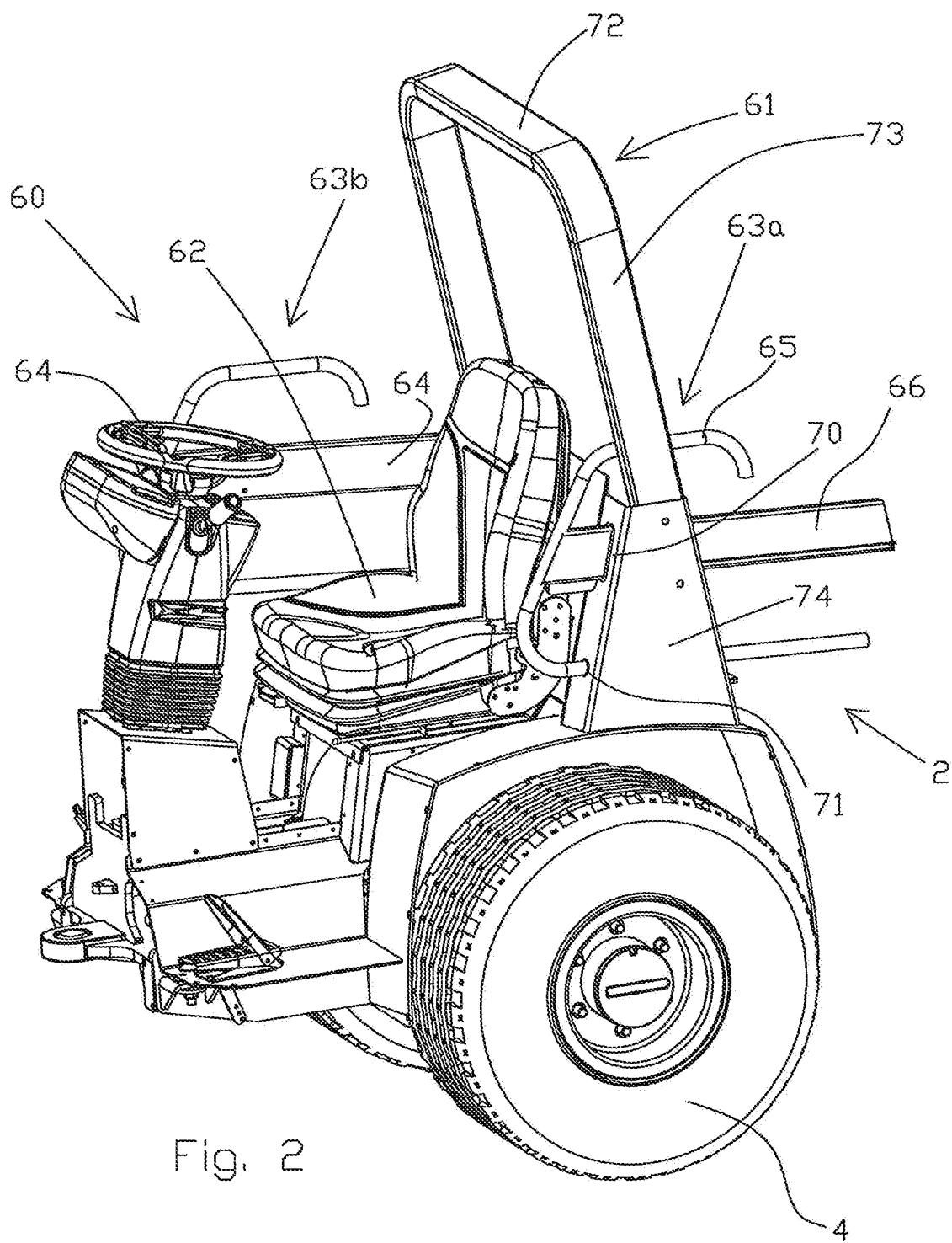
FIG. 2 shows a perspective view of the driver's space of the vehicle, including two fall prevention elements.

In an embodiment according to the invention, the vehicle 1 is provided with a driver's space 60 with a rollover protection 61, a steering wheel 64, two fall prevention elements 63a, 63b (denoted together below by reference numeral 63), and a seat 62 for a driver. The driver's space 60 is situated on the side of the rear frame part 2 near the pivot pin 16. In FIG. 2, fall prevention element 63b is in the closed position and the fall prevention element 63a is in the open position.

The rollover protection 61 delimits the driver's space 60. The rollover protection is provided with a frame which, viewed in the viewing direction of a driver B seated on the seat 62, extends substantially behind the seat 62, in which a driver B is situated within the boundaries of the rollover protection 61 during normal use of the vehicle 1.

The frame comprises a top end 72, a hollow portion 74 and two longitudinal sides 73 extending between the top end 72 and the hollow portion 74. Preferably, the frame is made from a stiff material, such as for example a high-grade metal like stainless steel, as a result of which deformation of the material while the vehicle 1 is overturning remains limited.

Together with the rollover protection 61, the fall prevention elements 63 form a boundary of the driver space 60, wherein the fall prevention elements 63 are provided on two opposite longitudinal sides of the seat 62. Each fall prevention element 63 is slidable between the closed position, in which a driver sitting on the seat 62 is prevented from falling off the seat and out of the vehicle 1, and the open position, in which the driver can freely take a seat on the seat 62 from the outer side of the vehicle 1 via the space which, in the closed position, is occupied by the fall prevention element 63, or can step out of the vehicle 1. In the open position, each of the fall prevention elements 63, viewed in the viewing direction of a driver seated in the seat 62, is situated behind the position of the fall prevention element 63 in the closed position.

The fall prevention elements 63a, 63b extend through and are movable by the frame of the rollover protection 61. The fall prevention elements 63 each comprise a bar 65 or a pipe 65, and rectangular pipe 66 connected to the bar. Bar 65 is curved between two ends, with the tube 66 extending from a portion situated between the two ends of the bar 65. The two ends and the tube 66 extend substantially in the same direction, with a distance being present between the two ends and the tube 66. For each of the tubes 66, a slot is provided in the frame. As a result of this slot, the associated tube 66 is movable through the frame and from and to the hollow portion 74 of the frame. Furthermore, a through-opening is provided between the slot 70 and the rear wheels 4,5 for receiving an end of the bar 65.

Each of the tubes 66 is held in the frame between three rollers 67a, 67b, 67c provided in the hollow portion 74 of the frame. The rollers are rotatably connected to the frame of the rollover protection 61. The rollers are arranged at a distance from one another in such a way that the associated tube 66 is held between the rollers.

The frame of the fall prevention means 61 contains displacement means in the form of a pulley device 69, such as for example, a spring balancer. The pulley device 69 comprises a line, one end of which is connected to a pulley and the other end is coupled with a hook 71, and pressing means, such as a spring, for rolling the line on the pulley. The hook 71 engages with a projection 68 of the tube.

The loader 1 is provided with locking means for blocking one or each of the fall prevention elements 63 in the open position. Such locking means may comprise, for example, a hook or clamp which engages with a part of a fall prevention element 63 in its open position. Alternatively, the locking means could also comprise, for example, a magnet, optionally more specifically a switchable electromagnet, by means of which a fall prevention element can be held in the open position.

The locking means may be operated manually and/or automatically using operating means. Thus, it is conceivable that the operating means are provided with a sensor provided in or near the seat 62 for detecting a driver B on the seat, and/or a button in and/or under the seat, with the locking means being deactivated if the driver B has been detected. When the driver B takes a seat on the seat 62, the fall prevention elements 63, optionally on account of the pressing means of the pulley device, are freely movable in the direction of the closed position.

Figure 3:
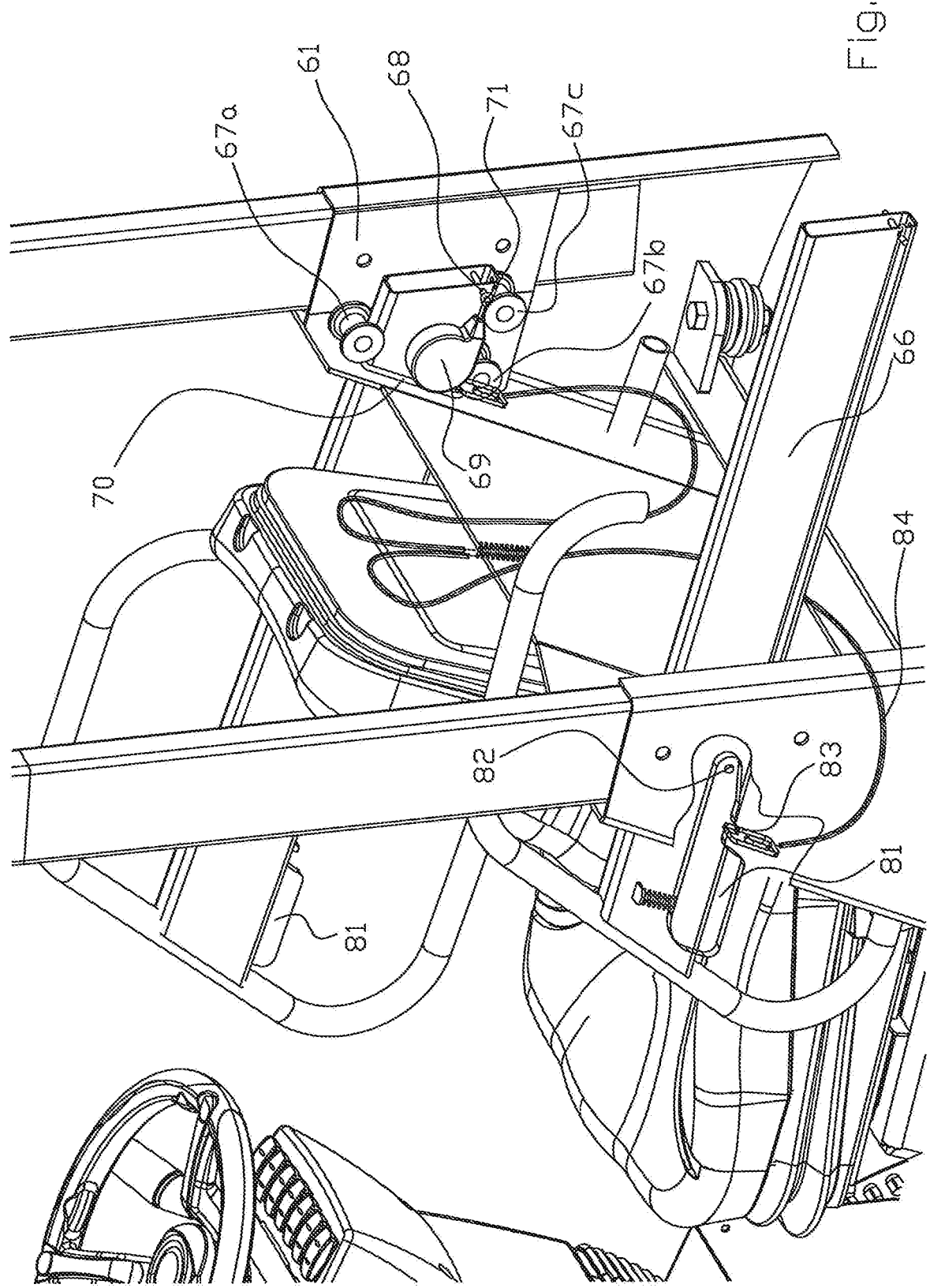
FIG. 3 shows the driver's space from FIG. 2 in another perspective view.

The embodiment from FIG. 3 shows how each tube 66 is provided with a manually operable handle 81 which is connected to the tube 66 so as to be pivotable about pivot pin 82. The handle 81 is provided with a hook part which, in the open position of the fall prevention element 63, hooks behind a catch 83. This prevents the fall prevention element 63 from moving from the open position to the closed position despite the action of the pulley device 69. The hooking cooperation between the handle 81 and catch 83 may be cancelled in two ways. Firstly via a Bowden cable 84 which is connected to the respective catch and moves the catch downwards as soon as a person takes a seat on the seat 62. To this end, the Bowden cable 84 may be mechanically coupled to the seat 62 or may be operated via a sensor, such as a pressure switch, which detects when a person sits down on the seat 62. Alternatively, a driver may also push handle 81, so that it pivots upwards about pivot pin 82, as a result of which the hooking cooperation between the catch 83 and handle 81 is cancelled. In both cases, the fall prevention element 63 will move from the open position to the closed position due to the action of pulley device 69.

Relative terms regarding the orientation of the vehicle and/or components thereof, such as for example, horizontal, vertical, above, below, along, in this document are based on a normal frame of reference, in which the vehicle is situated on an even, horizontal terrain and the vehicle wheels are in contact with the terrain, unless indicated otherwise.

The invention claimed is:

1. A vehicle comprising a frame, at least one front wheel and at least one rear wheel wherein the total number of front wheels plus rear wheels is at least three, drive means for driving at least one of the front wheels and rear wheels, a seat for a driver of the vehicle, at least one fall prevention element on at least one longitudinal side of the seat preventing, in a closed position of the fall prevention element, a driver sitting on the seat from falling off the seat and out of the vehicle, wherein the fall prevention element is displaceable between an open position, in which the driver can freely take a seat on the seat from an outer side of the vehicle via a space which, in the closed position, is occupied by the fall prevention element, or can step out of the vehicle, and the closed position, wherein the fall prevention element is slidable between the open position and the closed position, wherein the position of the fall prevention element in the open position, viewed in a viewing direction of a driver seated on the seat, is situated behind the position of the fall prevention element in the closed position, the at least one fall prevention element further includes a bar that is curved between ends of the bar, wherein the vehicle is provided with locking means for keeping the fall prevention element in the open position in an operational state of the locking means, wherein the vehicle is provided with operating means for operating the locking means, wherein the operating means comprise further sensor means for detecting whether or not a person is sitting on the seat, wherein the vehicle comprises displacement means for moving the fall prevention element from the open position to the closed position, wherein the vehicle further includes a rollover protection.

2. The vehicle according to claim 1, wherein the displacement means for moving comprise an elastic spring element whose elasticity provides a driving force for moving the fall prevention element from the open position to the closed position.

3. The vehicle according to claim 1, wherein the vehicle comprises a frame with a front frame part and a rear frame part, at least one front wheel which is connected to the front frame part so as to be rotatable about an associated front horizontal rotation axis, at least one rear wheel which is connected to the rear frame part so as to be rotatable about an associated rear horizontal rotation axis, drive means for driving the at least one front wheel and/or the at least one rear wheel, the vehicle furthermore comprising a steering device for steering the vehicle by causing the front frame part and the rear frame part to pivot with respect to each other about a vertical pivot pin.

4. The vehicle according to claim 3, wherein the seat is provided on the rear frame part.

5. The vehicle according to claim 1, wherein the vehicle is provided with a lifting arm.

6. The vehicle according to claim 1, wherein the vehicle has a dead weight of between 2,500 and 5,000 kg.

7. The vehicle according to claim 1, wherein the at least one fall prevention element further includes a pipe, the pipe being connected to the bar.

8. The vehicle according to claim 7, wherein the pipe is a rectangular pipe.

* * * * *